US011236637B2

(12) United States Patent
Parnin et al.

(10) Patent No.: US 11,236,637 B2
(45) Date of Patent: Feb. 1, 2022

(54) AUXILIARY LUBRICATION SYSTEM WITH FLOW MANAGEMENT VALVE

(71) Applicant: UNITED TECHNOLOGIES CORPORATION, Farmington, CT (US)

(72) Inventors: Francis Parnin, Suffield, CT (US); Anthony Spagnoletti, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 517 days.

(21) Appl. No.: 16/230,711

(22) Filed: Dec. 21, 2018

(65) Prior Publication Data

US 2020/0200043 A1 Jun. 25, 2020

(51) Int. Cl.
*F01D 25/20* (2006.01)
*F01M 11/06* (2006.01)
*F02C 7/06* (2006.01)

(52) U.S. Cl.
CPC ........... *F01D 25/20* (2013.01); *F01M 11/067* (2013.01); *F02C 7/06* (2013.01); *F05D 2260/98* (2013.01); *F05D 2270/301* (2013.01)

(58) Field of Classification Search
CPC ................................ F01M 11/067; F02C 7/06
See application file for complete search history.

(56) References Cited

U.S. PATENT DOCUMENTS

| | | | |
|---|---|---|---|
| 4,153,141 A | 5/1979 | Methlie | |
| 4,531,358 A * | 7/1985 | Smith | F16N 29/02 60/39.08 |
| 4,976,335 A * | 12/1990 | Cappellato | F16N 7/40 184/6.4 |
| 6,463,819 B1 * | 10/2002 | Rago | F01M 11/067 184/6.2 |
| 7,387,189 B2 * | 6/2008 | James | F01D 25/18 184/6.11 |
| 7,506,724 B2 | 3/2009 | Delaloye | |
| 8,230,974 B2 | 7/2012 | Parnin | |
| 8,424,646 B2 * | 4/2013 | Parnin | F16N 29/00 184/6 |
| 8,833,086 B2 * | 9/2014 | Parnin | F16H 57/0435 60/779 |
| 9,410,448 B2 | 8/2016 | Sheridan et al. | |

(Continued)

FOREIGN PATENT DOCUMENTS

| | | |
|---|---|---|
| EP | 1925856 | 5/2008 |
| EP | 2253805 | 11/2010 |
| WO | 2015126500 | 8/2015 |

OTHER PUBLICATIONS

European Patent Office, European Search Report dated May 4, 2020 in Application No. 19204350.3.

*Primary Examiner* — Michael R Mansen
*Assistant Examiner* — Mark K Buse
(74) *Attorney, Agent, or Firm* — Snell & Wilmer L.L.P.

(57) ABSTRACT

A lubrication system is disclosed. In various embodiments, the lubrication system includes a storage tank configured to store a lubricant; a flow management valve configured to direct the lubricant to a starvation tolerant component and to a valve exit conduit; and a main pump configured to receive the lubricant from the storage tank and to pump the lubricant to the flow management valve and to a starvation intolerant component.

16 Claims, 4 Drawing Sheets

(56) References Cited

U.S. PATENT DOCUMENTS

| | | | |
|---|---|---|---|
| 10,072,521 B2 | 9/2018 | Mastro et al. | |
| 10,107,197 B2 | 10/2018 | Parnin et al. | |
| 2006/0081419 A1* | 4/2006 | Care | F16N 7/40 |
| | | | 184/6.11 |
| 2008/0006483 A1* | 1/2008 | Parnin | F01D 25/20 |
| | | | 184/6 |
| 2008/0116009 A1* | 5/2008 | Sheridan | F01D 25/18 |
| | | | 184/6.4 |
| 2010/0236213 A1* | 9/2010 | Schilling | F02K 3/06 |
| | | | 60/39.08 |
| 2010/0294371 A1* | 11/2010 | Parnin | F16K 17/36 |
| | | | 137/1 |
| 2012/0103728 A1* | 5/2012 | Portlock | F02C 7/36 |
| | | | 184/6.12 |
| 2013/0318939 A1* | 12/2013 | Parnin | F02C 7/36 |
| | | | 60/39.08 |
| 2013/0318940 A1* | 12/2013 | Parnin | F16H 57/0486 |
| | | | 60/39.08 |
| 2013/0319798 A1* | 12/2013 | Sheridan | F01M 11/067 |
| | | | 184/6.11 |
| 2016/0305284 A1* | 10/2016 | Mastro | F01M 11/0004 |
| 2017/0002738 A1 | 1/2017 | Sheridan | |
| 2018/0283211 A1* | 10/2018 | Parnin | F01D 25/164 |

* cited by examiner

AUXILIARY LUBRICATION SYSTEM WITH FLOW MANAGEMENT VALVE

GOVERNMENT LICENSE RIGHTS

This invention was made with Government support awarded by the United States. The Government has certain rights in this invention.

FIELD

The present disclosure relates to gas turbine engines and, more particularly, to lubrication systems used in gas turbine engine compressors.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, which extracts energy from the hot combustion gases to power the compressor section, the fan section and various other loads occurring within or proximate a gas turbine engine. Various of the components within a gas turbine engine require lubrication. A main pump is typically driven by a high pressure spool, connected through gearing, and is used to pump lubricating fluid to all such engine components, including, for example, rolling element bearings, gear teeth, carbon seals, and journal bearings for supporting gears.

The main pump typically pumps fluid from a passage connected to a main reservoir that holds both liquid and air. During normal operating conditions, the fluid settles at the bottom of the main reservoir and displaces air to the top. However, in a gas turbine engine mounted on an aircraft, the main reservoir may experience "negative gravity" conditions (or a negative gravity event) such as the aircraft turning upside down, the aircraft accelerating toward the Earth at a rate equal to or greater than the rate of gravity, or the aircraft decelerating at the end of a vertical ascent.

Under negative gravity conditions, the fluid in the main reservoir can rise to the top, which can expose an opening of the passage to air and interrupt the supply of fluid to the main pump and, consequently, interrupt the supply of fluid to the engine components requiring lubrication. During such conditions, the fluid may also rise to the tops of individual component compartments, thereby preventing the fluid within the individual component compartments from being scavenged back to the main reservoir. Certain engine components, such as carbon seals used in the compressor and turbine sections, are relatively intolerant to lubricant starvation and can be damaged by short periods of non-lubricating operation during negative gravity conditions. Other components, such as rolling element bearings or drive gears, may exhibit greater tolerance for lubricant starvation. In the more extreme situations, the starvation intolerant components may be rendered inoperative.

SUMMARY

A lubrication system is disclosed. In various embodiments, the lubrication system includes a storage tank configured to store a lubricant; a flow management valve configured to direct the lubricant to a starvation tolerant component and to a valve exit conduit; and a main pump configured to receive the lubricant from the storage tank and to pump the lubricant to the flow management valve and to a starvation intolerant component.

In various embodiments, a boost pump is configured to receive the lubricant from the main pump and to pump the lubricant to the starvation intolerant component. In various embodiments, a scavenge pump is configured to receive the lubricant from the starvation intolerant component and the starvation tolerant component. In various embodiments, the scavenge pump is configured to pump the lubricant to the storage tank.

In various embodiments, the lubrication system includes a make-up reservoir in fluid communication with the storage tank. In various embodiments, the make-up reservoir includes a bias mechanism configured to adjust a volume of the lubricant within the make-up reservoir. In various embodiments, the bias mechanism is configured to be responsive to a fluid pressure within the lubrication system. In various embodiments, the bias mechanism is configured to be responsive to a fluid pressure in a scavenge pump exit conduit.

In various embodiments, the flow management valve includes a two-way valve configured to direct the lubricant to the starvation tolerant component during a normal operation state and to the valve exit conduit during a non-normal operation state. In various embodiments, the flow management valve is configured to be responsive to a pressure sensor configured to detect at least one of the normal operation state and the non-normal operation state. In various embodiments, the pressure sensor is configured to detect a fluid pressure downstream of the main pump and upstream of the flow management valve. In various embodiments, the valve exit conduit is configured to direct the lubricant to the main pump during the non-normal operation state.

A gas turbine engine is disclosed. In various embodiments, the gas turbine engine includes one or more starvation tolerant components; one or more starvation intolerant components; and a lubrication system, including a storage tank configured to store a lubricant, a flow management valve configured to selectively direct the lubricant to the one or more starvation tolerant components, and a main pump configured to receive the lubricant from the storage tank and to pump the lubricant to the flow management valve and to the one or more starvation intolerant components.

In various embodiments, the gas turbine engine further includes a boost pump configured to receive the lubricant from the main pump and to pump the lubricant to the one or more starvation intolerant components and a scavenge pump configured to receive the lubricant from the one or more starvation intolerant components and the one or more starvation tolerant components.

In various embodiments, the gas turbine engine further includes a make-up reservoir configured to provide a make-up volume of the lubricant to the lubrication system during a negative gravity event. In various embodiments, the make-up reservoir is configured to adjust a volume of the lubricant within the make-up reservoir between a normal operation volume and a negative gravity event volume.

In various embodiments, the flow management valve includes a two-way valve configured to direct the lubricant to the one or more starvation tolerant components during a normal operation state and to the main pump during a negative gravity event. In various embodiments, the flow management valve is configured to be responsive to a pressure sensor configured to detect at least one of the normal operation state and the negative gravity event.

A method of selectively supplying a lubricant to a starvation tolerant component of a gas turbine engine is disclosed. In various embodiments, the method includes the steps of operating a main pump configured to receive the lubricant from a storage tank and to pump the lubricant to a flow management valve and to a starvation intolerant component; detecting a negative gravity event; and causing the flow management valve to terminate delivery of the lubricant to the starvation tolerant component; permit continued supply to the boost pump from the main oil pump; and to reroute excess lubricant to the inlet of the main supply pump. In various embodiments, the method further includes operating a make-up reservoir to provide a make-up volume of the lubricant to the main pump.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
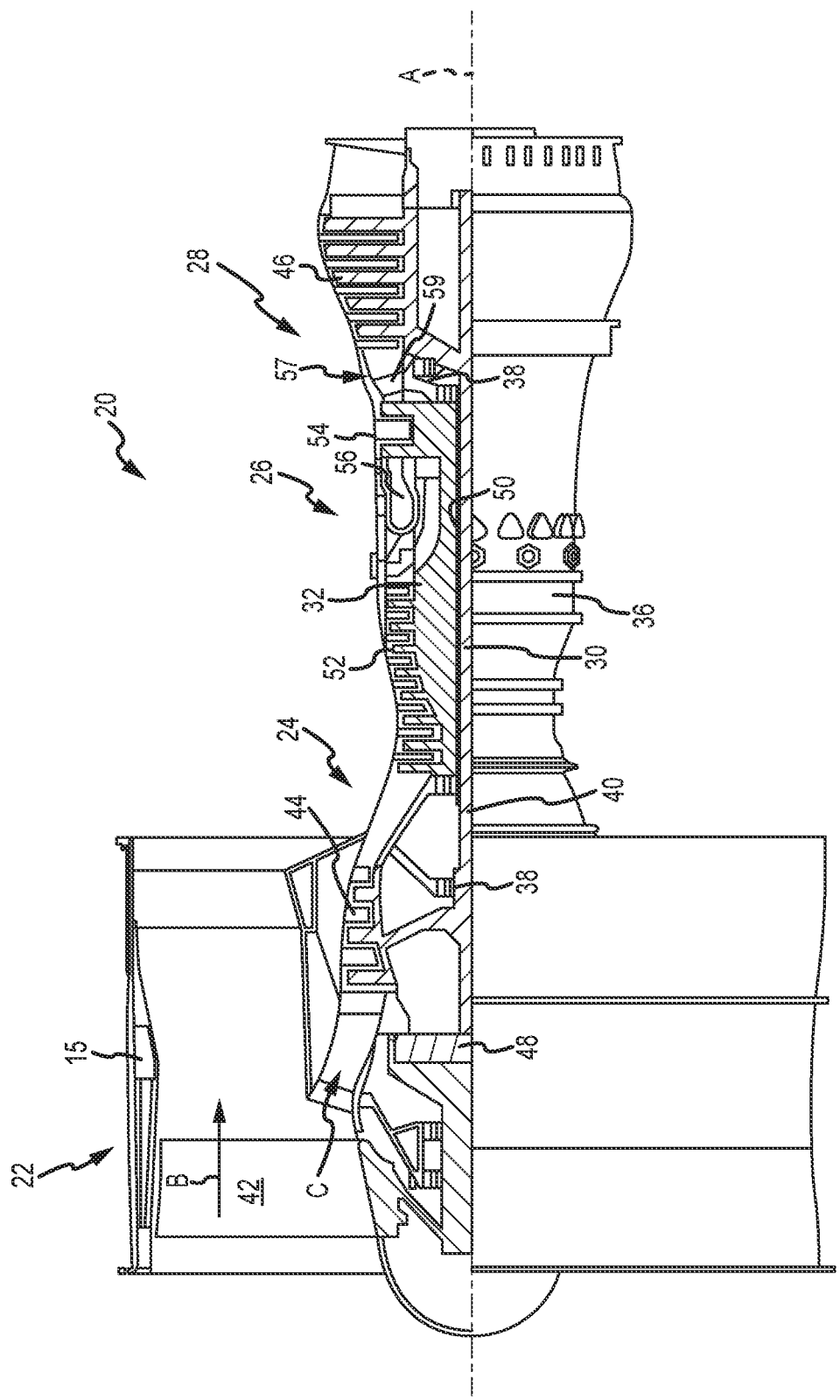
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
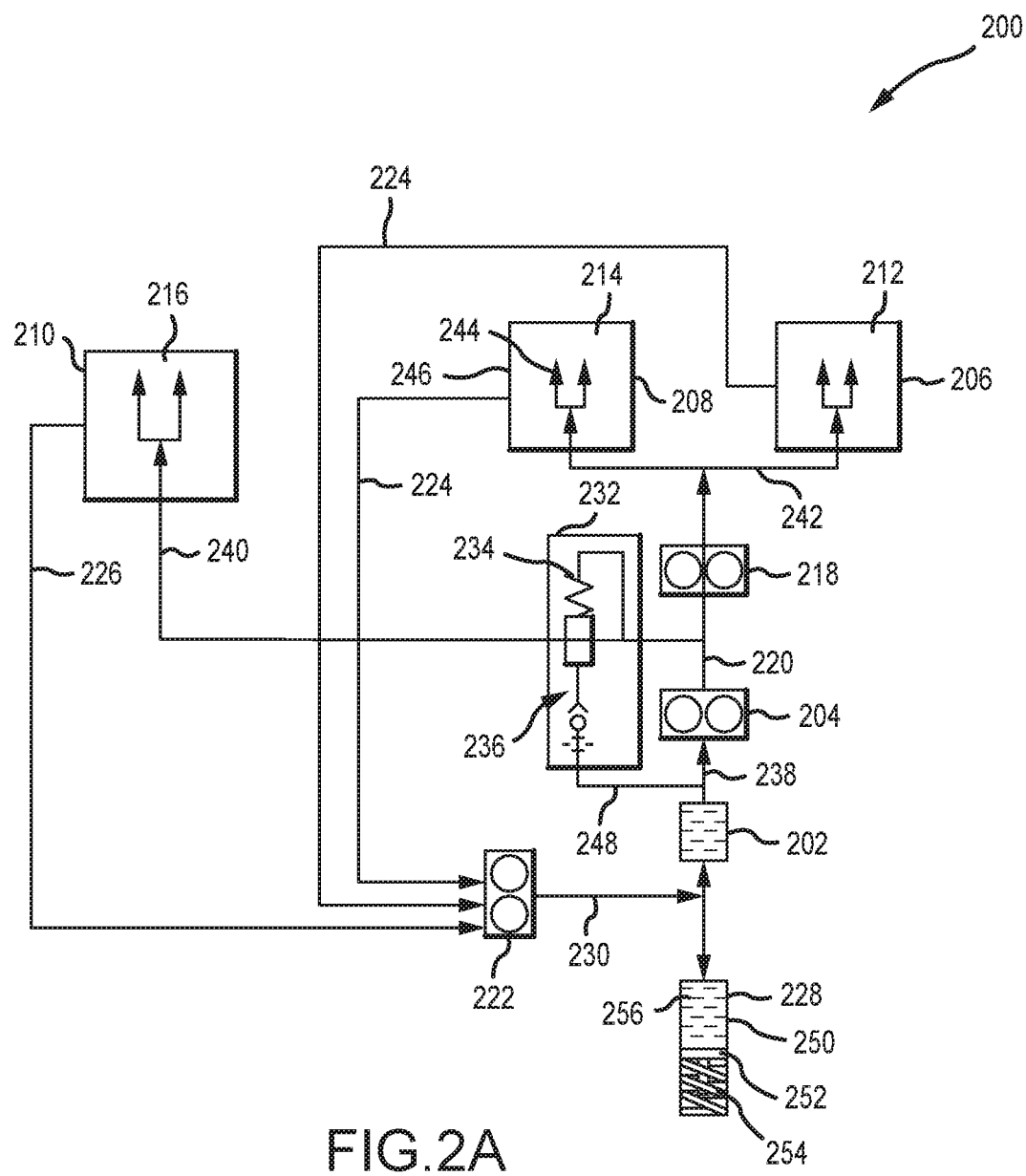
FIGS. 2A and 2B are schematic views of an oil supply system, in accordance with various embodiments.
Figure 2B:
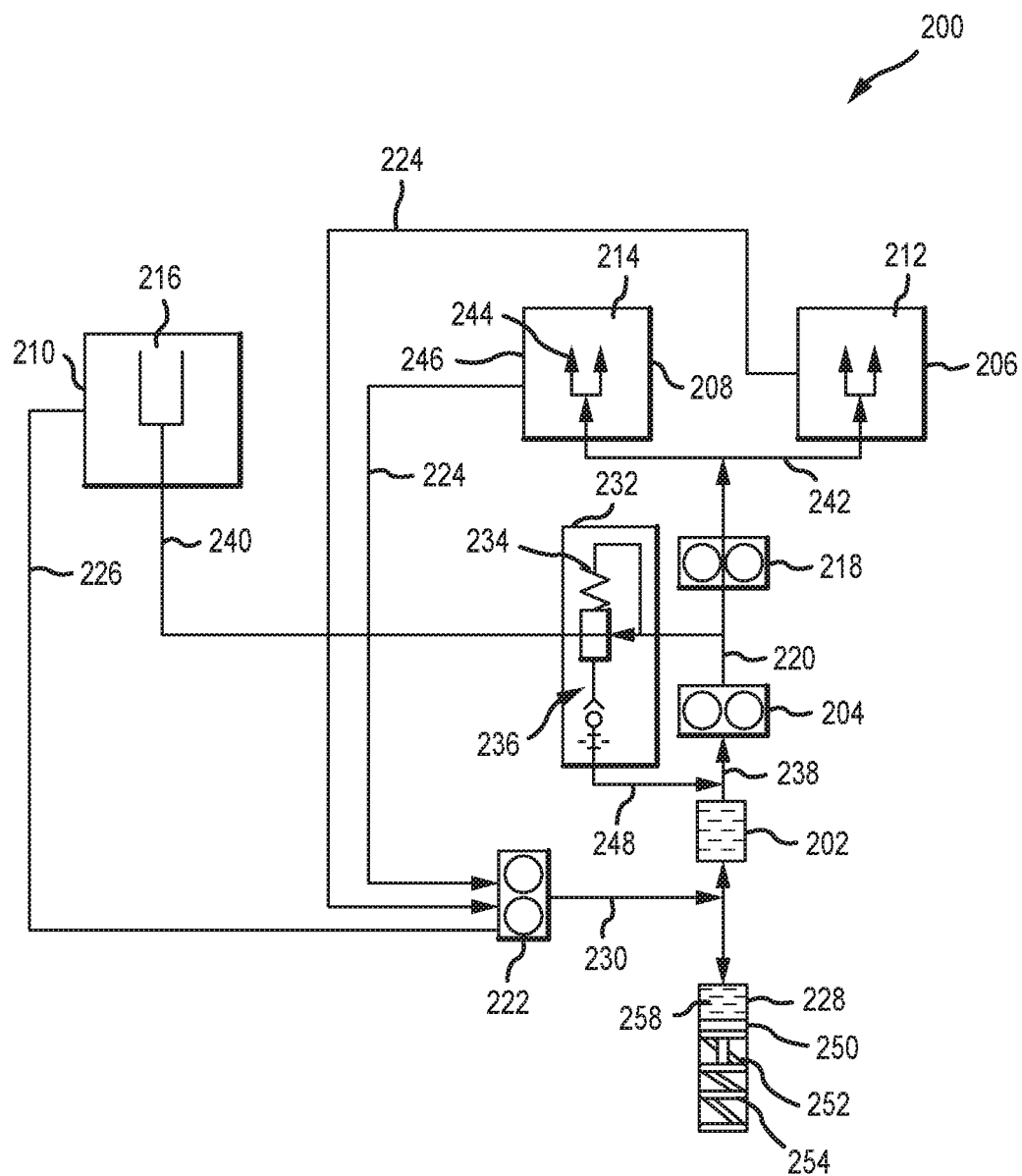

Referring now to FIGS. 2A and 2B, a lubrication system 200 is configured to cycle a lubricant to and from one or more engine components (e.g., bearings, seals and drive gears) of a gas turbine engine, such as, for example, the gas turbine engine 20 described above with reference to FIG. 1. The lubrication system 200 may include a lubricant storage tank 202 for storing a quantity of lubricant and may include a main pump 204 for drawing a supply of lubricant from the lubricant storage tank 202 and passing that lubricant to the one or more engine components, which include, for example, a first starvation intolerant component 206, a second starvation intolerant component 208 and a starvation tolerant component 210. In various embodiments, the first starvation intolerant component 206 may comprise a first seal 212, the second starvation intolerant component 208 may comprise a second seal 214 and the starvation tolerant component 210 may comprise a rolling element bearing 216. While exemplar starvation tolerant and intolerant components are referenced, the disclosure contemplates, generally, starvation intolerant components to include any component that is intolerant to interruptions to the supply of lubrication fluid and starvation tolerant components to include any component that is not intolerant to interruptions to the supply of lubrication fluid. The lubrication system 200 may also include a boost pump 218 for drawing a supply of lubricant from a main pump exit conduit 220 of the main pump 204 and passing that lubricant to one or more starvation intolerant engine components, which include, for example, the first starvation intolerant component 206 and the second starvation intolerant component 208.

The lubrication system 200 further includes a scavenge pump 222. In various embodiments, the scavenge pump 222 receives lubricant from one or more starvation intolerant components, including, for example, the first starvation intolerant component 206 and the second starvation intolerant component 208, by one or more starvation intolerant component return conduits 224. Similarly, the scavenge pump 222 is configured to receive lubricant from one or more starvation tolerant components, including, for example, the starvation tolerant component 210, by one or more starvation tolerant component return conduits 226. In various embodiments, the scavenge pump 222 comprises multiple stages, each of which includes its own inlet and is dedicated to a particular component or a compartment of such particular component. In various embodiments, the lubrication system 200 further includes a make-up reservoir 228 that acts as an accumulator. As described further below, the make-up reservoir 228 is configured to receive lubricant from a scavenge pump exit conduit 230 and to discharge lubricant into the scavenge pump exit conduit 230, depending on the pressure within the scavenge pump exit conduit 230.

The lubrication system 200 further includes one or more components configured to permit or prevent fluid flow to the one or more starvation tolerant components, including, for example, the starvation tolerant component 210, depending on whether a negative gravity event or similar situation is being experienced. In various embodiments, for example, the lubrication system 200 includes an oil flow management valve 232 that is configured to permit the flow of lubricant to the starvation tolerant component 210 during normal operation (see FIG. 2A) and to prevent the flow of lubricant to the starvation tolerant component 210 during a negative gravity event or similar situation (see FIG. 2B). The oil flow management valve 232 may include a pressure sensor 234 configured to sense the fluid pressure within the main pump exit conduit 220 of the main pump 204. As described below, the pressure sensor 234 is configured to operate a two-way valve 236 within the oil flow management valve 232, such that lubricant flows to the starvation tolerant component 210 during normal operation and to a main pump inlet conduit 238 during a negative gravity event.

During normal operation or a normal operation state (see FIG. 2A), for example, the oil flow management valve 232 receives lubricant from the main pump exit conduit 220. The pressure sensor 234 detects a normal operating pressure within the main pump exit conduit 220 and, in response, directs the lubricant flowing into the oil flow management valve 232 to the one or more starvation tolerant components, including the starvation tolerant component 210, through one or more starvation tolerant component inlet conduits 240. At the same time, lubricant in the main pump exit conduit 220 is fed to the boost pump 218 for supply to the one or more starvation intolerant components, including the first starvation intolerant component 206 and the second starvation intolerant component 208, through one or more starvation intolerant component inlet conduits 242. During normal operation, then, lubricant flows, for example, to each of the first starvation intolerant component 206, the second starvation intolerant component 208 and the starvation tolerant component 210. In various embodiments, the fluid pumped to each of the components exits one or more nozzles 244 to lubricate the respective component, collects within a component housing 246 and returns to the scavenge pump 222 via component return conduits, such as, for example, the one or more starvation intolerant component return conduits 224 and the one or more starvation tolerant component return conduits 226.

On the other hand, during a non-normal operation state, such as, for example, a negative gravity event or similar situation (see FIG. 2B), the oil flow management valve 232 still receives lubricant from the main pump exit conduit 220. The pressure sensor 234, however, detects a drop in pressure within the main pump exit conduit 220 and, in response, directs the lubricant flowing into the oil flow management valve 232 to a valve exit conduit 248 configured to route the lubricant back to the main pump inlet conduit 238, thereby shutting off the flow of lubricant to the one or more starvation tolerant components, including the starvation tolerant component 210. Similar to normal operation, lubricant in the main pump exit conduit 220 is still fed to the boost pump 218 for supply to the one or more starvation intolerant components, including the first starvation intolerant component 206 and the second starvation intolerant component 208, through one or more starvation intolerant component inlet conduits 242. During a negative gravity event, then, lubricant flows, for example, only to each of the first starvation intolerant component 206 and the second starvation intolerant component 208, with no fluid flowing to the starvation tolerant component 210. Note that by recirculating, through the main pump 204, the lubricant that would otherwise go to the starvation tolerant component 210, the total through-flow from the lubricant storage tank 202 to the boost pump 218 is balanced and avoids excessive pressure build-up within the main pump exit conduit 220. In the absence of a boost pump, the flow management valve 232 may still be configured to reduce flow of lubricant to the starvation intolerant components to an amount sufficient to match a specific need to such components and to efficiently use the available lubricant volume to maximize the oil supply duration during such negative gravity event.

During a negative gravity event, lubricant within the lubricant storage tank 202 or the component housing 246 associated with each of the one or more tolerant and intolerant components may collect at locations that prevent or restrict the lubricant from flowing to the main pump 204 or to the scavenge pump 222, respectively. This occurrence may result in a temporary shortage of lubricant and an attendant drop in pressure in the various conduits of the lubrication system 200, including the scavenge pump exit conduit 230 and the main pump exit conduit 220. As described above, when the pressure drops in the main pump exit conduit 220, the oil flow management valve 232 detects the drop in pressure and effectively shuts down a part of the lubrication system 200—e.g., the part of the system feeding lubricant to the one or more starvation tolerant components. This reduces the need for lubricant to make up for the shortage of lubricant, but may not be sufficient in and of itself. Accordingly, in various embodiments, the reduced pressure in the scavenge pump exit conduit 230 results in an influx of lubricant from the make-up reservoir 228 to make up for any remaining shortage of lubricant. While the foregoing description characterizes the oil flow management valve 232 as being configured to detect the drop in pressure, the disclosure contemplates such detection also be accomplished through engine control systems configured to monitor lubricant pressures at various locations throughout the lubrication system 200 or one or more of such lubricant pressures and attitudes or accelerations or like parameters of the aircraft or its motion, to determine when the oil flow management valve 232 should be closed or opened.

In various embodiments, for example, the make-up reservoir 228 includes a chamber 250 defined, in part, by a piston 252 at one end. The piston 252 is operated by a bias mechanism which, for example, may comprise a coil spring 254. During normal operation, when the pressure in the scavenge pump exit conduit 230 is high, relative to the pressure during a negative gravity event, lubricant is forced into the chamber 250 of the make-up reservoir 228. The bias mechanism is tuned to allow the chamber 250 to expand during normal operation to a normal operation volume 256, as illustrated in FIG. 2A. During a negative gravity event, when the pressure drops in the scavenge pump exit conduit 230, the bias mechanism responds to the drop in pressure by urging the piston 252 into the chamber 250, thereby reducing the normal operation volume to a negative gravity event volume and, consequently, pumping lubricant into the scavenge pump exit conduit 230 and into the lubricant storage tank 202. The negative gravity event volume may, in various embodiments, depend on the severity of the negative gravity event but, in any case, is sufficient to provide excess lubricant in an amount sufficient to make up for the shortage of lubricant (e.g., a make-up volume of lubricant). Following termination of the negative gravity event, when the fluid pressure in the scavenge pump exit conduit 230 increases to a normal operating pressure, the lubricant (e.g., the make-up volume of lubricant) is forced back into the chamber 250, which ultimately returns to its normal operation volume.

Figure 3:
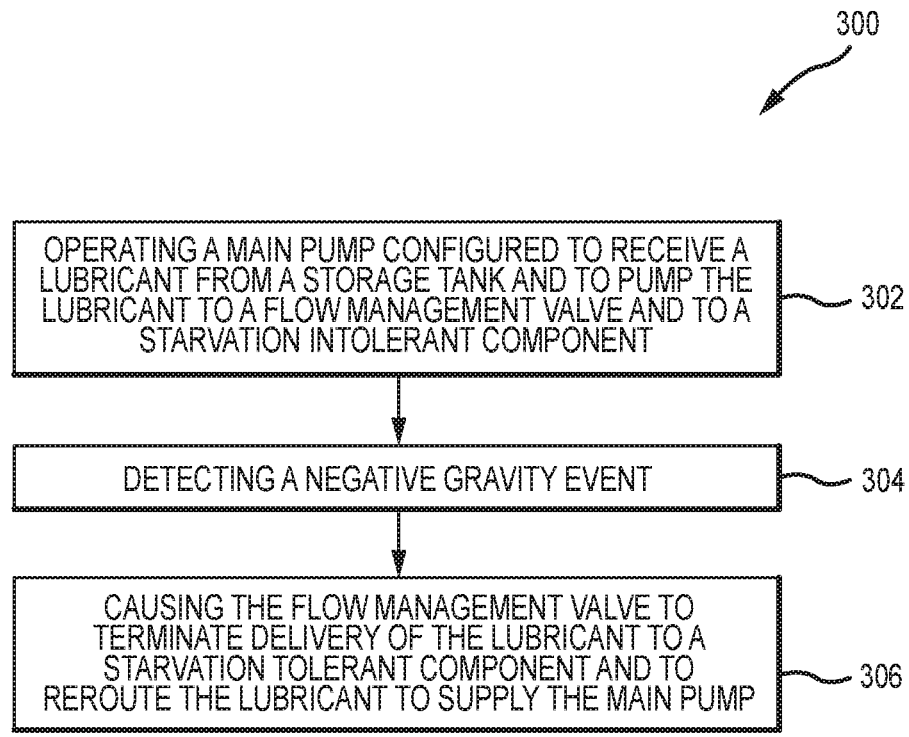
FIG. 3 describes a method of selectively terminating supply of a lubricant to a starvation tolerant component of a gas turbine engine, in accordance with various embodiments.

Referring now to FIG. 3, a method 300 of selectively supplying a lubricant to a starvation tolerant component of a gas turbine engine is described. In various embodiments, a first step 302 of the method includes operating a main pump configured to receive the lubricant from a storage tank and to pump the lubricant to a flow management valve and to a starvation intolerant component. In a second step 304, a negative gravity event is detected. A third step 306 of the method includes causing the flow management valve to terminate delivery of the lubricant to a starvation tolerant component and to reroute the lubricant to supply the main pump. In various embodiments, the method 300 further includes operating a make-up reservoir to provide a make-up volume of the lubricant to the main pump.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A lubrication system, comprising:
   a storage tank configured to store a lubricant;
   a flow management valve configured to direct the lubricant to a starvation tolerant component and to a valve exit conduit; and
   a main pump configured to receive the lubricant from the storage tank and to pump the lubricant to the flow management valve and to a starvation intolerant component,
      wherein the flow management valve includes a two-way valve configured to direct the lubricant to the starvation tolerant component during a normal operation state and to the valve exit conduit during a non-normal operation state and
      wherein the valve exit conduit is configured to direct the lubricant to the main pump during the non-normal operation state.

2. The lubrication system of claim 1, further comprising a boost pump configured to receive the lubricant from the main pump and to pump the lubricant to the starvation intolerant component.

3. The lubrication system of claim 2, further comprising a scavenge pump configured to receive the lubricant from the starvation intolerant component and the starvation tolerant component.

4. The lubrication system of claim 3, wherein the scavenge pump is configured to pump the lubricant to the storage tank.

5. The lubrication system of claim 1, further comprising a make-up reservoir in fluid communication with the storage tank.

6. The lubrication system of claim 5, wherein the make-up reservoir includes a bias mechanism configured to adjust a volume of the lubricant within the make-up reservoir.

7. The lubrication system of claim 6, wherein the bias mechanism is configured to be responsive to a fluid pressure within the lubrication system.

8. The lubrication system of claim 6, wherein the bias mechanism is configured to be responsive to a fluid pressure in a scavenge pump exit conduit.

9. The lubrication system of claim 1, wherein the flow management valve is configured to be responsive to a pressure sensor configured to detect at least one of the normal operation state and the non-normal operation state.

10. The lubrication system of claim 9, wherein the pressure sensor is configured to detect a fluid pressure downstream of the main pump and upstream of the flow management valve.

11. A gas turbine engine, comprising:
  one or more starvation tolerant components;
  one or more starvation intolerant components; and
  a lubrication system, including:
    a storage tank configured to store a lubricant,
    a flow management valve configured to selectively direct the lubricant to the one or more starvation tolerant components,
    a main pump configured to receive the lubricant from the storage tank and to pump the lubricant to the flow management valve and to the one or more starvation intolerant components, and
    a make-up reservoir configured to provide a make-up volume of the lubricant to the lubrication system during a negative gravity event, the make-up reservoir configured to adjust a volume of the lubricant within the make-up reservoir between a normal operation volume and a negative gravity event volume.

12. The gas turbine engine of claim 11, further comprising a boost pump configured to receive the lubricant from the main pump and to pump the lubricant to the one or more starvation intolerant components and a scavenge pump configured to receive the lubricant from the one or more starvation intolerant components and the one or more starvation tolerant components.

13. The gas turbine engine of claim 11, wherein the flow management valve includes a two-way valve configured to direct the lubricant to the one or more starvation tolerant components during a normal operation state and to the main pump during a negative gravity event.

14. The lubrication system of claim 13, wherein the flow management valve is configured to be responsive to a pressure sensor configured to detect at least one of the normal operation state and the negative gravity event.

15. A method of selectively supplying a lubricant to a starvation tolerant component of a gas turbine engine, comprising:
  operating a main pump configured to receive the lubricant from a storage tank and to pump the lubricant to a flow management valve and to a starvation intolerant component;
  detecting a negative gravity event; and
  causing the flow management valve to terminate delivery of the lubricant to the starvation tolerant component and to reroute the lubricant to supply the main pump.

16. The method of claim 15, further comprising operating a make-up reservoir to provide a make-up volume of the lubricant to the main pump.

\* \* \* \* \*